March 20, 1956 H. D. ROWE 2,738,829
REVERSIBLE AND BERTHABLE SEAT
Filed Nov. 17, 1951 3 Sheets-Sheet 1
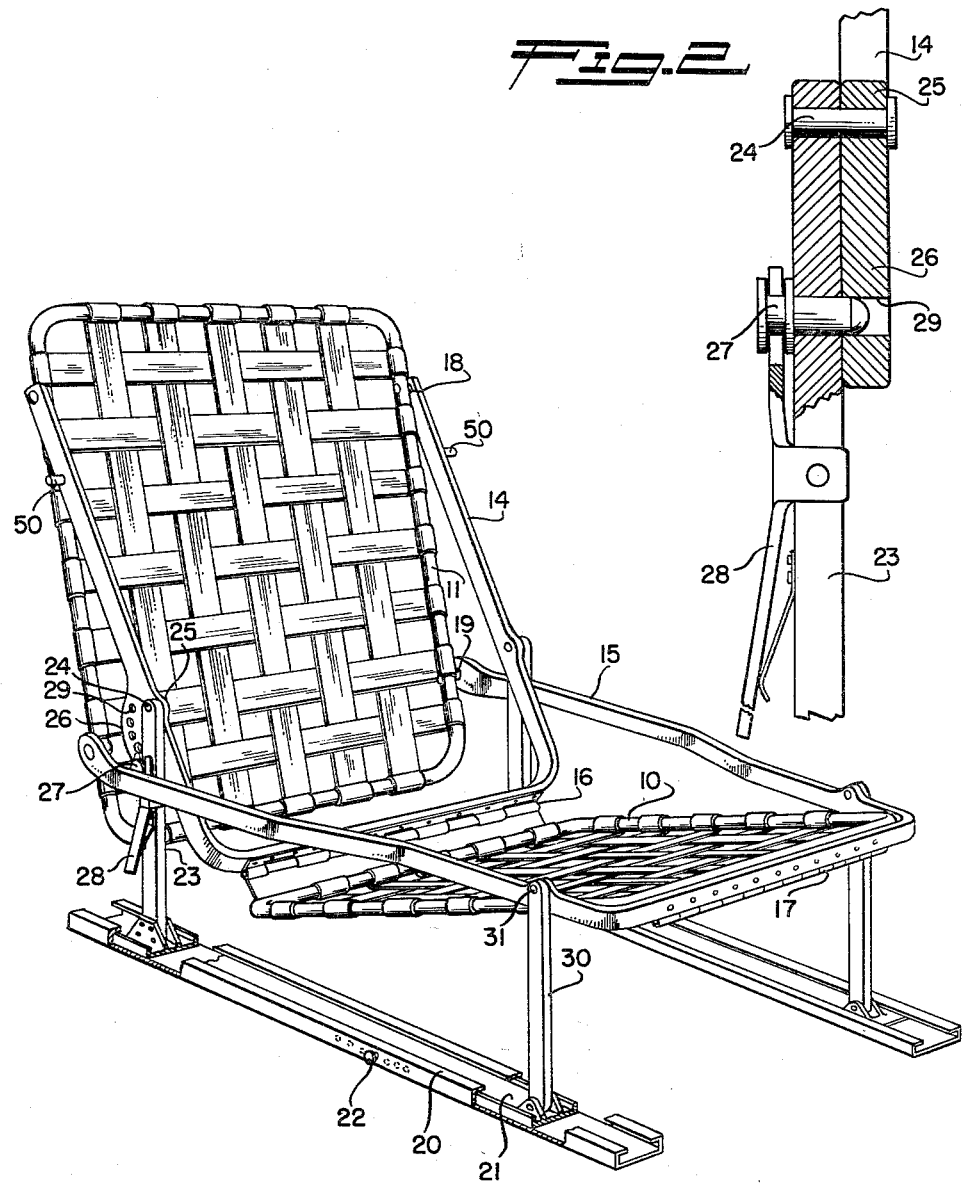
INVENTOR.
HARBERT D. ROWE
BY
George Sullivan
Agent

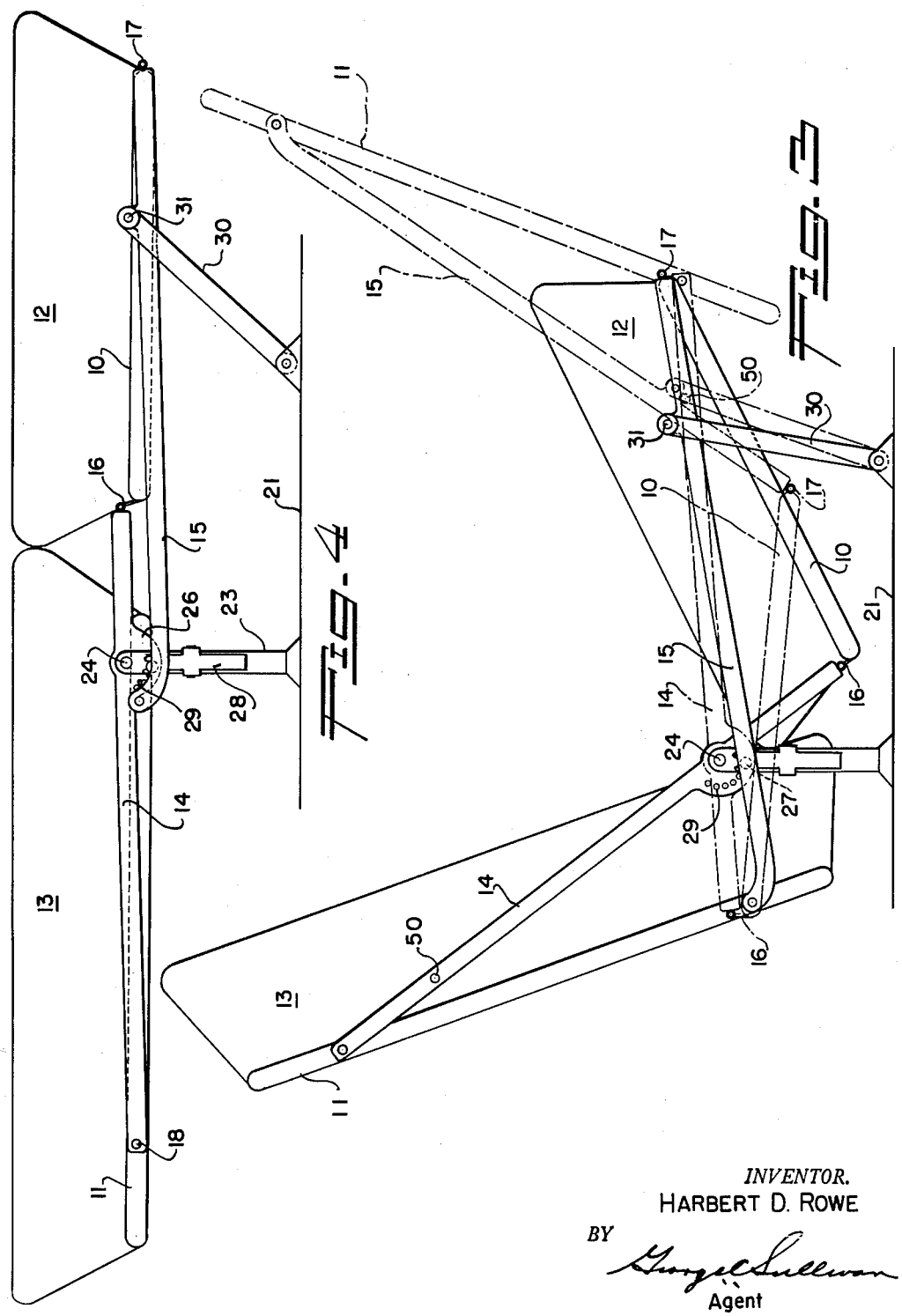

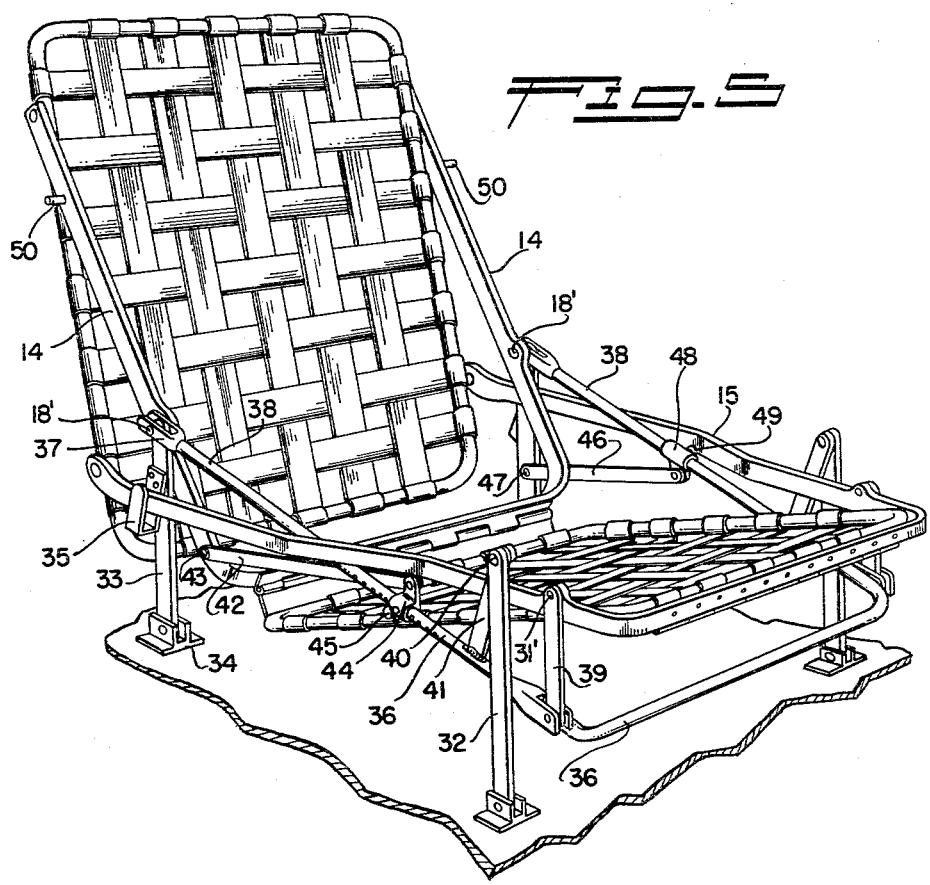

United States Patent Office 2,738,829
Patented Mar. 20, 1956

2,738,829

REVERSIBLE AND BERTHABLE SEAT

Harbert D. Rowe, Glendale, Calif., assignor to Lockheed Aircraft Corporation, Burbank, Calif.

Application November 17, 1951, Serial No. 256,895

6 Claims. (Cl. 155—14)

This invention relates to adjustable reclining or berthable and reversible seats of the type wherein the seat back is angularly adjusted, lowered, or turned end over end respectively, to secure the desired position, movement of the seat back automatically adjusting the angle of the seat to a position suitable to cooperate with the back position.

The present invention is an improvement and simplification of the chair disclosed in my prior Patent No. 2,514,798 issued July 11, 1950, and more particularly relates to chairs suitable for automotive, and like services such as the front seats in an automobile, which, by means of my present invention, may be adjusted fore and aft relative to the steering wheel thereof, and can be reversed to face the rear seat, or arranged to cooperate with the rear seat to form a full length bed. By using two seat units for the front seat the car may be driven in the normal manner while the right hand portion of the front seat either faces the rear seat, or is made into a bed or emergency ambulance berth.

It is a principal object of this invention to provide a basic seat structure comprising a pair of U-shaped links, the bases of which are pivoted or hinged to opposite ends of a seat frame or pan, the ends of the sides of the links being connected to a back frame or pan with the links crossed to permit end over end movement of the back frame for seat reversal. This unit of separate seat and back frames connected by the U-shaped links will hereafter be generically referred to as the seat structure, which is supported from the floor by further mounting linkages connected to the U-shaped links. The advantages and novelty of this arrangement reside in the support and control of the seat frame or pan directly by the U-shaped links entirely independent of the floor mounting arrangements.

It is also an object of the invention to provide supporting means for the generic seat structure, as above defined, which supporting means provides for fore and aft adjustment of the seat structure, independent of the selected position of the back frame relative to the seat frame.

It is a further object of this invention to provide simple position locking means for both the seat posture position and fore and aft adjustments of the seat structure as a whole.

Other and further objects of my invention will become apparent following the detailed description of a typical preferred form of the invention, wherein reference will be made to the accompanying drawings, in which:

Figure 1 is a perspective view of a seat structure embodying my invention and incorporating one form of floor mounting to provide fore and aft adjustment of the chair structure;

Figure 2 is a detail of the posture lock for Figure 1;

Figure 3 is a side view of the seat structure of Figure 1 in its normal forward position with the reverse position shown in dotted lines;

Figure 4 is a side view of the seat structure of Figure 1 shown in its berthed position; and Figure 5 is a perspective view of a basic seat structure similar to Figure 1 embodying a different type of floor mounting, posture control and fore and aft adjustments for the seat structure.

As shown in the drawings:

In the various figures the basic seat structure and geometry is the same; this structure being shown with its normal position facing to the right. The seat back will normally be reclined or lowered to form a berth from this normal position, it being a matter of choice whether it is to be lowered or reclined from its reversed position. The normal position would usualy be the forward position, as in the case of an automobile driver's seat, but obviously the normal position can be selected as best suits the berthing arrangement desired, wherein the seat cushion of a seat in another row would be utilized to cooperate with my berthable seat to provide a full length bed; as taught in my prior patent referred to.

The basic seat structure is the same in both disclosed forms of my invention, the differences therebetween residing in the supporting structures therefor. This basic seat structure comprises separate seat and back frames or pans 10 and 11, on which cushions 12 and 13 are mounted. Inside and outside links 14 and 15 are respectively hinged at the base of the U to the rear and front ends of the seat frame, as indicated at 16 and 17. The inside link hinge 16 is offset above the seat frame as shown because the inside link must fold down above and nearly parallel to the seat frame in connection with the berthing and reversing movement of the back. The ends of the arms of the inside link 14 are pivoted at 18 to the back frame 11, and the ends of the arms of the outside link 15 are pivoted at 19 to the brack frames, the arrangement being such that the links 14 and 15 are crossed intermediate the pivots and bases thereof, the arms of the inside link 14 approaching parallelism with the back frame with the pivot points 18 near the top thereof in the normal or forward position; while when the back frame is turned clockwise end over end to the reversed position, shown in dotted lines in Figure 3, the arms of the outside link 15 approach parallelism with the back frame with the pivot points 19 thereof near the top of the back frame. This basic seat structure is common to Figures 1 and 5, the difference between the structures of these figures residing in the floor supports and posture locks for the two versions.

In the embodiment of my invention disclosed in Figures 1 to 4, separate floor tracks 20, in the form of inturned channels, are positioned on either side of the seat structure; a tie member 21 on which the chair is mounted being slidable fore and aft therein and locked in selected position by a pin 22 through the side of the track 20. This showing is intended to be a schematic equivalent of various driver's seat adjustments now in use in automobiles, and takes the place of a parallel linkage arrangement, shown in Figure 5 and to be later described. At the rear end of the tie members 21 rigid upright posts 23 are mounted, the upper ends of which posts are pivoted at 24 to ears 25 on the arms of the inside links 14. These ears 25 are so positioned on the link arms, and the length of the posts 23 is such that the inside link 14 can be pivoted from its horizontal berthing position on the left of Figure 4 to its dotted line reversed position on the right of Figure 3; while the seat frame follows the motion of the base of the link 14 without interference with the floor. A quadrant 26 is welded on the one arm of the link 14 concentric with the pivot in the ear 25, and a retractable pin 27 is carried by the post 23 and operated by a lever 28 (Figure 2) to engage in holes 29 in the quadrant to form a posture lock for the normal, reclining, and berthed positions of the basic seat structure, as best shown in Figure 2.

The front end of the tie member 21 pivotally supports another post 30, the upper end of which pivotally supports the arms of the outside link at 31, near the hinge attaching the outside link 15 to the seat frame 10. The pairs of posts 23 and 30 on each side of the seat structure form the support therefor throughout the range of movement of the back frame 11 relative to the seat frame 10.

To reverse the direction an occupant would face when occupying the seat structure, reference may be had to Figure 3 wherein the normal or forward facing position of the seat back is shown in full lines at the left side of the figure and corresponds to the perspective view of Figure 1. To reverse the seat to the dotted line position at the right side of Figure 3, the lock pin 27 is pulled out and the back frame 11 bodily moved clockwise end over end into the dotted line position, the arms of the inner link 14 pivoting about the top of the post 23 and the arms of the outer link 15 pivoting about the top of the post 30. The seat frame 10 is shifted and tilted by the movements of the bases of the U links about the pivot points in the posts 23 and 30. If reclining or berthing movements from the reversed position are not desired, stop pins 50 may be carried by the inside link 14, which pins rest on the outside link 15 in the reversed position.

When the back frame is to be reclined or such movement is continued to the berthing position of Figure 4, the movement of the base of the inner link 14 lifts the attached edge of the seat frame until when the inner link 14 reaches the level position the seat frame is also level. In this latter position the free edge of the seat, at the extreme right of Figure 4, is supported by the outer link 15, the load thereon being balanced on the front post 30 with the back frame pivot 19 holding the outer link horizontal.

A modified mounting for the basic seat structure is shown in Figure 5 wherein front and back parallel links 32 and 33 on each side of the seat structure are pivotally mounted at their lower ends in floor fittings 34. The rear links 33 are pivoted to the arms of the inside link 14 at 18', and these rear links have brackets 35 attached thereto for supporting the arms of the outside links 15 when the back frame 11 is lowered to the berthing position. A third U-shaped member 36 has the free ends 37 of its arms 38 pivoted at 18' in common with the back links 32 and the inside link 14. The U-shaped member 36 extends forwardly and downwardly to a position beneath the front edge of the seat frame, links 39 pivoted at one end 40 to the U-shaped member 36 engaging with pivots 31' on the outer link 15 at a point equivalent to the front post pivot 31 in the previously described version.

The front pair of parallel links 32 have their upper ends pivoted at 40 to arms 41 secured to the U-shaped member 36, thereby supporting the latter which, in turn, supports the outer link 15 of the basic seat structure.

The basic seat structure is reversible, reclining and berthable in the same way as that of Figures 1 to 4. In the version of Figure 5, a posture control lock comprises a link 42 pivoted at one end 43 to the inner link 14 and at the other end to a slider 44 which slides on the U member and is locked in a selected adjusted position by a pin 45. Fore and aft movement of the basic seat structure is obtained by distortion of the parallelograms formed by the pairs of links 32 and 33; and the selected position can be locked by a link 46 pivoted to the back link 33 at 47 and to a slider 48 on the other arm of the U member, the slider being locked in a selected position by another pin 49.

In the operation of both versions of my invention, starting from the normal or forward positions wherein the seat occupant faces to the right in all figures, the basic seat structure may be adjusted by releasing the pin 27 or 45, as the case may be. With the pin retracted the back frame 11 can be adjusted to a more reclined position or lowered counterclockwise to the berthed position of Figure 4, the base of the inside link 14 serving to control the movement of the edge of the seat frame 10 hinged thereto. Thus a reclined position will reduce the slope of the seat frame and the berthed position will level the seat frame. Such reclining or berthing movement of the back frame also serves to move the seat frame forwardly or to the right and such movement of the back frame also pushes the outside link to correspond with such seat frame movement. To reverse the basic seat structure the back frame is turned end over end or clockwise from the left hand position of Figure 3 to the dotted right hand position of this figure, which movement reverses the tilt of the seat frame.

It will thus be seen that my invention provides an improved and simplified reversible, berthable and reclining chair construction wherein the seat and back frames are positively and pivotally linked to each other with said links pivoted to the supporting structure, and that the supporting structure includes movable carriage members adapted to bodily shift the seat and back member into proper relationship with other chairs preceding and following the berthable chair in the same longitudinal row.

Having thus described my invention and the present preferred embodiments thereof, I desire to emphasize the fact that many modifications may be resorted to in a manner limited only by a just interpretation of the following claims.

I claim as my invention:

1. A reversible and berthable seat structure comprising separate seat and back frames for supporting suitable cushions, inside and outside links each in the form of a U, a hinge connection between the base of the U of the inside link and one end of the seat frame, said hinge connection having a hinge axis fixed relative to the seat, and the outside link having the base of the U hinged to the opposite end of the seat frame, the legs of the two links being crossed and movable relative to each other with the free ends thereof pivoted in spaced relationship to the sides of the back frame, the pivotal connections being such that the back frame can be turned end over end to reverse the position of the back frame relative to the seat frame, and being spaced and related so that the back frame can be lowered to move the back into berthing position, and mounting means for supporting said links and seat structure relative to a floor.

2. A seat structure as defined in claim 1 wherein said last mentioned means comprises adjustable parallel motion links on each side of the chair structure, said links being connected at their upper ends to said inside and outside links to allow both tilting movements of the links and fore and aft adjustments of the seat structure.

3. A seat structure as defined in claim 1 wherein said last mentioned means comprises adjustable parallel motion links on each side of the chair structure, said links being connected at their upper ends to said inside and outside links to allow fore and aft adjustments of the seat structure, and means for locking said parallel motion links whereby to lock the seat structure in selected fore and aft positions.

4. A seat structure as defined in claim 1 including means to lock the inside and outside links in the seat posture position selected for use.

5. A seat structure as defined in claim 1 wherein said mounting means comprises pairs of pivoted links on each side of the seat structure which form distortable parallelograms, a third U-shaped member having its ends pivoted to the inside link in spaced relation to the base thereof, the rear links of each pair of links forming the parallelograms being also pivoted at the pivoted connection between said inside link and the third U-shaped member, short links pivotally connected between the outside link and the third U-shaped member in spaced relationship to the base thereof, offset connections in spaced relation to the base of the third U-shaped member pivoted to the front links of each pair of links forming the parallelograms, and pivotal floor mountings for the lower ends of said parallelogram links whereby distortion of the parallelogram formed thereby moves the seat structure fore and aft to provide seat adjustments.

6. A seat structure as defined in claim 1 wherein means are provided to lock said seat structure in selected posture positions.

References Cited in the file of this patent

UNITED STATES PATENTS

| | | |
|---|---|---|
| 772,742 | O'Leary | Oct. 18, 1904 |
| 1,047,461 | Taylor | Dec. 17, 1912 |
| 2,066,557 | Cox | Jan. 5, 1937 |
| 2,235,237 | Saunder | Mar. 18, 1941 |
| 2,514,798 | Rowe | July 11, 1950 |

FOREIGN PATENTS

| | | |
|---|---|---|
| 419,677 | Great Britain | July 1, 1936 |
| 696,380 | France | Oct. 14, 1930 |